United States Patent [19]

Hopf

[11] Patent Number: 5,240,617
[45] Date of Patent: Aug. 31, 1993

[54] PHASE-SEPARATION EQUIPMENT AND METHOD FOR THERMALLY SEPARATING AN EMULSION, IN PARTICULAR A WATER-OIL EMULSION

[76] Inventor: Karl-Heinz Hopf, Ritter-von Eitzenberger Strasse 6, Bayreuth, Fed. Rep. of Germany, 8580

[21] Appl. No.: 622,962

[22] Filed: Dec. 6, 1990

[30] Foreign Application Priority Data

Dec. 7, 1989 [DE] Fed. Rep. of Germany ... 8914167[U]

[51] Int. Cl.$^5$ ............................................. C02F 1/24
[52] U.S. Cl. ................................. 210/703; 210/708; 210/774; 210/177; 210/180; 210/221.2
[58] Field of Search ......... 210/703, 213, 712, DIG. 5, 210/702, 704, 708, 774, 800, 803, 175, 177, 180, 181, 187, 188, 194, 198.1, 201, 205, 220, 221.1, 221.2

[56] References Cited

U.S. PATENT DOCUMENTS 4,231,867  11/1980  Sutphin ................................ 210/703

FOREIGN PATENT DOCUMENTS 633303  6/1963  Belgium .
0030200  6/1981  European Pat. Off. .
1205219  11/1965  Fed. Rep. of Germany .
3147460  6/1981  Fed. Rep. of Germany .
2142549  1/1985  United Kingdom .

*Primary Examiner*—Frank Sever
*Attorney, Agent, or Firm*—Bacon & Thomas

[57] ABSTRACT

Phase separation equipment for thermally separating an emulsion, in particular, a water-oil emulsion, includes a container for receiving the emulsion, a heater for heating the emulsion in the container, a discharge outlet from the top of the container for evacuating a vapor phase of the emulsion and a system for introducing air into the lower region of the container for forming a vapor cloud at the surface of the emulsion at a lower temperature than would be expected. The vapor cloud is discharged from the container, and the condensible portion of the vapor is condensed and separated from the vapor stream. The separated air or residual gas is then fed back into the air stream supplied to the bottom area of the container so that a closed loop air circulation system is provided. The system avoids discharge of air and noxious odors into the atmosphere while enhancing the separation of the lower boiling point vapor from the emulsion.

14 Claims, 2 Drawing Sheets

PHASE-SEPARATION EQUIPMENT AND METHOD FOR THERMALLY SEPARATING AN EMULSION, IN PARTICULAR A WATER-OIL EMULSION

BACKGROUND OF THE INVENTION

1. Field of the Invention

The present invention concerns phase-separation equipment and a method for thermally separating an emulsion, in particular a water-oil emulsion, comprising a container to receive the emulsion, a heater to heat the emulsion in the container, a discharge to evacuate volatile emulsion constituents and also a condenser connected to the discharge to condense the vapor constituents.

2. Description of Related Technology

The operation of phase-separation equipment for the thermal separation of an emulsion is based on exploiting the different boiling points of the liquids forming the particular emulsion. Illustratively, oils boil up to about 300° C. whereas water boils at about 100° C. The thermal phase-separation technique makes use of this difference by heating the emulsion in the phase-separation container so that the liquid with the lower boiling point vaporizes and its vapor is evacuated at the surface of the emulsion. As regards to a water-oil emulsion specifically, the operating temperature, i.e. the emulsion temperature, is about 98° C. Manifestly the operation of such equipment demands much energy. Attempts already have been undertaken to minimize energy losses when operating such equipment by insulating the container wall etc. However, the steps resorted to so far have been inadequate to assure a really significant lowering of energy consumption.

The object of the present innovation is to create phase-separation equipment of the above species which at increased output evinces a comparatively lower energy consumption.

This problem is solved for the phase-separation equipment of the above species by using an apparatus for introducing distributed air into the emulsion. It was found in a surprising manner and in particular with respect to the separation of a water-oil emulsion that by introducing the air in a two-dimensional manner into the heated emulsion, the formation of a water-vapor cloud occurs already at temperatures much below the boiling point of water. After equipment start-up, the separation of water therefore can take place at a substantially lower emulsion temperature and consequently less heat need be supplied. Again there is a reduction in energy demand in the condenser in that only smaller amounts of residual water vapor must be condensed. Another advantage of the innovation is that the condensate collection per hour is increased by about 100% compared to the state of the art. Hence the innovation amounts to a very significant step in an energy conservation and an increase in output when operating phase-separation equipment.

An appropriate design of the equipment of the invention is characterized in that a feedback means is provided which connects the discharge to the apparatus for the distributed air introduction. The cloud mixture of air and water-vapor evacuated from the surface of the emulsion is fed to the condenser and from there the residual air is fed back into the emulsion, whereby the advantage is achieved that the strongly odorous exhaust air — which ordinarily passes from the condenser into the ambient — remains in a closed system and therefore does not stress the environment. Furthermore the heat held in the evacuated air is not lost, rather it is returned to the system. Also, this step will not stress the air supply of the plant or building.

By inserting a high-pressure blower in the feedback means, the rate of air input to the emulsion is made high and accordingly the efficiency of phase separation is improved.

In another design of the equipment of the innovation, the apparatus for the distributed input of air is located near the bottom of the container. This arrangement leads to optimal efficiency by enabling the air bubbles to pass through the entire emulsion volume.

Another appropriate design of the equipment of the innovation evinces the feature that the apparatus implementing the distributed air supply consists of a two-dimensional pipe array comprising individual output apertures. This pipe array can be inserted into or suspended in the container as a unit so that already extant plants can be retrofitted.

As a result the energy consumption of extant plants can be substantially lowered by simple, economical capital expenditure.

Because the pipe array comprises individual, mutually parallel pipes which are cross-connected at their one ends so as to communicate with the feedback means while their other ends are outside the container, each being provided with a detachable closure means, the pipe array is optimally accessible from the outside. The pipe array can be cleaned in simple manner. There is no need to clean the pipe array from the inside of the container or to dismantle the pipe array for that purpose.

The nozzle-effect air introduction per se causes substantial mixing of the emulsion and thereby uniform heating of this emulsion. An agitator will appropriately increase the intensiveness of mixing.

In another appropriate design, a device controlling the heater temperature in relation to the particular emulsion temperature is provided. As a result the emulsion temperature after start-up can be kept constant when the nozzle-effect of the feedback air becomes noticeable.

The diameter of the output apertures appropriately is in the range of 6 to 12 mm.

Appropriately the apparatus for introducing the air i.e. the pipes, is made of stainless steel.

DESCRIPTION OF THE DRAWINGS

An appropriate design of the phase-separation equipment of the invention is elucidated below in relation to the drawings.

DETAILED DESCRIPTION OF THE PREFERRED EMBODIMENT

Figure 1:
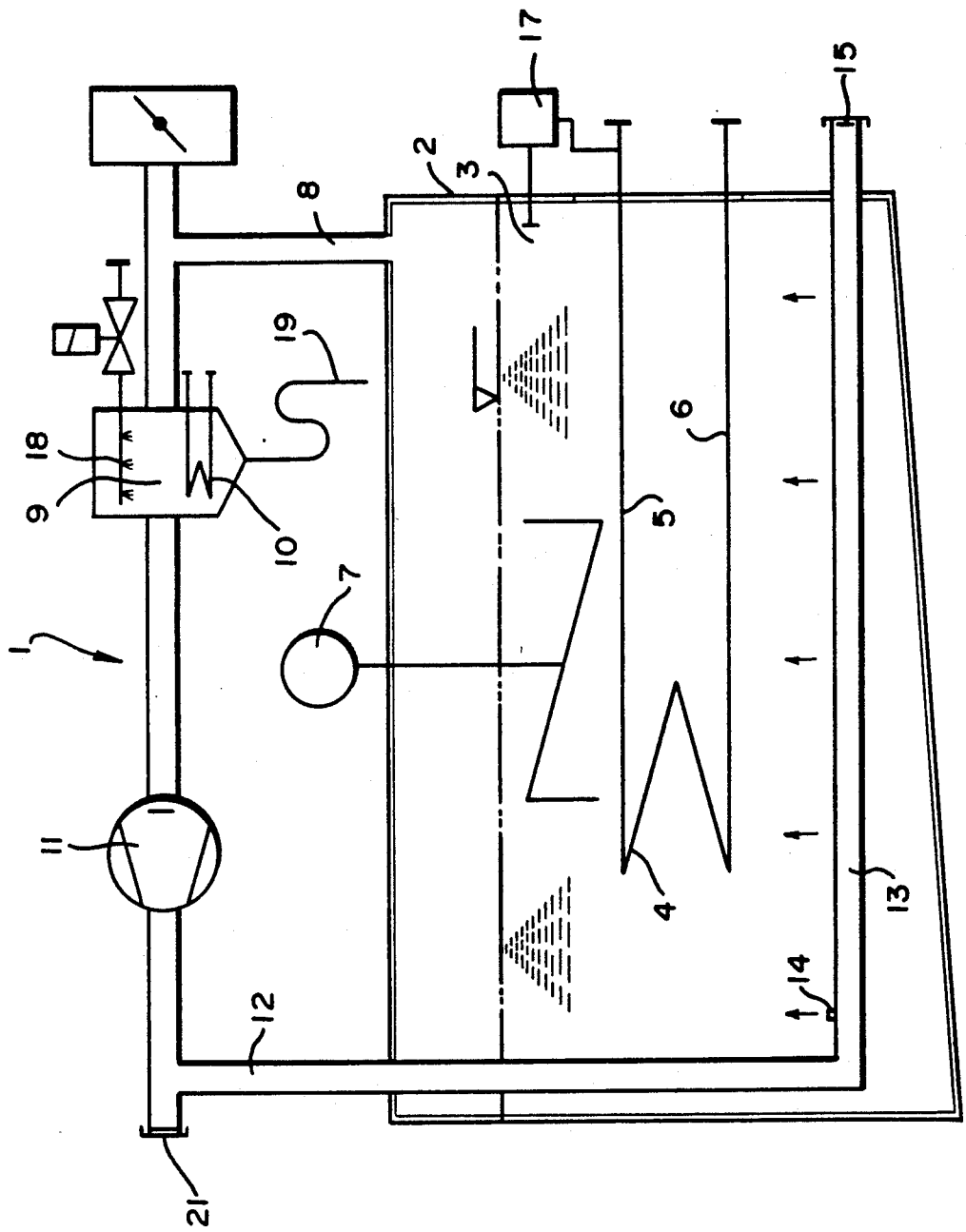
FIG. 1 is a much simplified schematic of the phase-separation equipment of the invention.

As shown by FIG. 1, the phase-separation equipment 1 comprises a container 2 the walls of which are fitted with insulation (not shown). An emulsion, in particular a water-oil emulsion 3 to be separated is present in the container 2.

The container 2 is filled to about 4/5 volume with the emulsion 3. Some empty space above the emulsion is required.

A heater 4, for instance in the form of a hot-water operated heat exchanger with an intake 5 and an outlet 6, is present inside the emulsion.

A device 17 to control the temperature of the heater 4 in relation to the particular emulsion temperature is also present.

The equipment of the invention comprises a discharge 8 mounted to the top side of the container 2 and terminating flush with the space free of emulsion of the container 2. The discharge 8 communicates with a condenser 9 condensing vapor constituents by means of a bare-tube heat exchanger 10, with mechanical droplet separation at the bare-tube heat exchanger 10 and further with subsequent but omitted impingement separators. The bare-tube heat exchanger 10 can be cleaned using a set of nozzles 18. The condensate is fed by means of a siphon 19 to a collecting means (not shown).

Moreover a pipe array 13 is present near the bottom of the container 2 and is connected to the condenser 9 by a feedback means 12 into which is integrated a high-pressure blower 11. The pipe array 13 consists of a plurality of preferably mutually parallel individual pipes with nozzles, or discharge apertures 14 distributed lengthwise at their top sides (also see FIG. 2).

The pipe array 13 passes through the wall of the container 2 at one location, that is on one side through its wall, whereby one side of each-pipe end is outside the container 2. These pipe ends are fitted with detachable closure means 15.

Moreover the equipment comprises an agitator 7 assuring improved turbulence of the emulsion around the heater 4.

Figure 2:
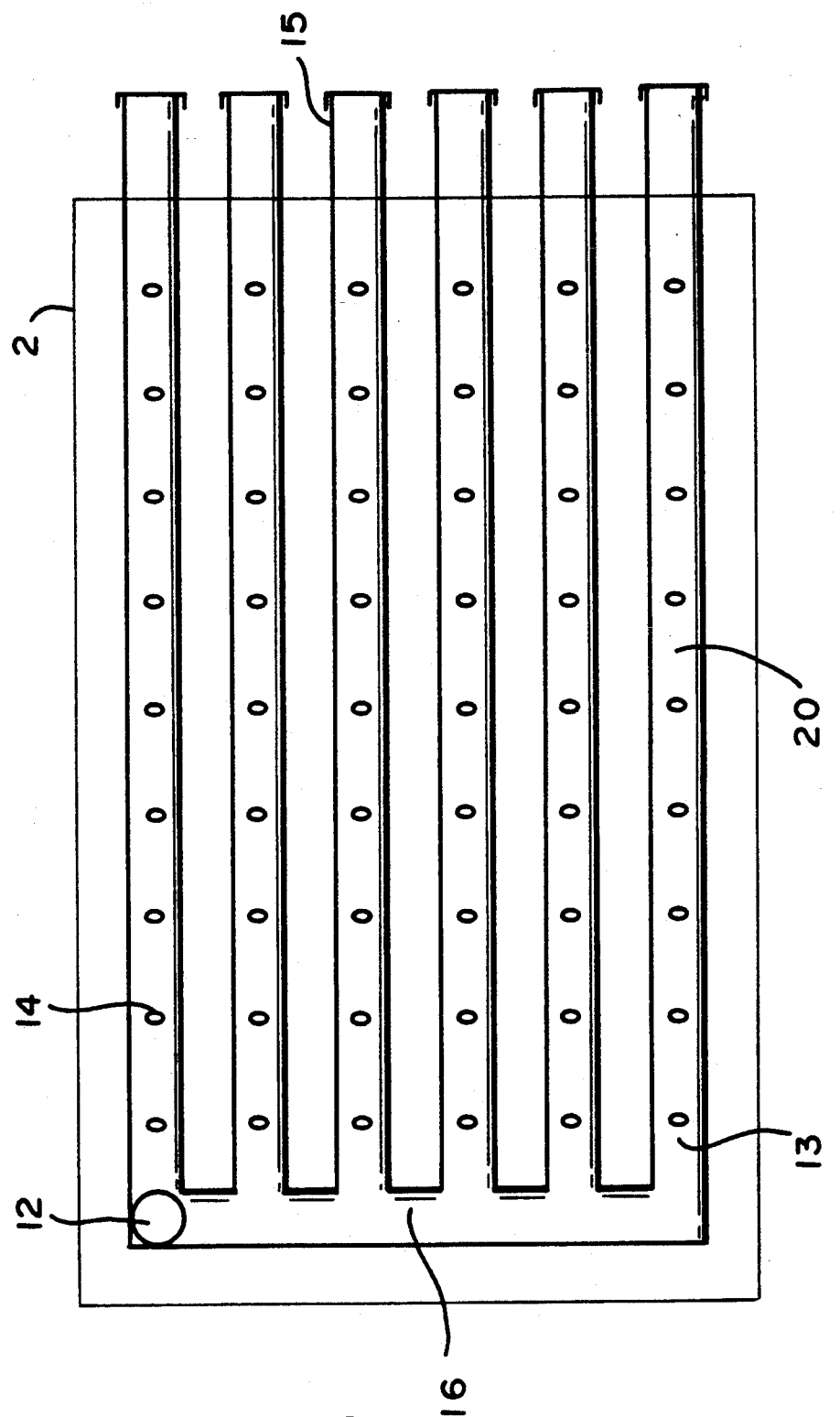
FIG. 2 shows the pipe array of the phase-separation equipment of FIG. 1.

For better comprehension, FIG. 2 shows the pipe array 13 in topview. This pipe array consists of a plurality of mutually parallel individual pipes 20 of which the outlet apertures 14 are distributed in the form of a matrix to fill the cross-sectional surface of the container 2.

The individual pipes 20 communicate inside the container 2 with each other by means of the cross-connection 16 which also assures communication to the feedback means 12.

The ends of the individual pipes 20 that are outside the container 2 are fitted with detachable closure means 15 assuring simple cleaning of the pipe array 13. As shown in FIG. 1, the feedback means 12 includes a hookup 21 making possible as needed separate compressed-air supply or allowing discharge of the feedback air.

The operation of the equipment of the innovation is discussed in further detail below.

Initially the emulsion 2, in particular a water-oil emulsion, is raised by the heater 4 to a temperature of 65° C. for instance. Then air aspirated from the empty space of the container 2 is forced through the high-pressure blower 11, the feedback means 12 and the cross-connection 16 into the pipe array 13 and discharged through the nozzles 14 into the emulsion 3. As a result finely distributed air bubbles are generated within the emulsion 3, and these bubbles surprisingly form a cloud of the liquid phase which must be separated (in particular water) already at essentially lower temperatures (starting at 55° C.) than the boiling point of water.

The diameter of the discharge apertures 14, i.e. nozzles at the top side of each pipe 20, preferably shall be between 6 and 12 mm. The air speed from the particular nozzles shall be in the range of 1 to 3 m/s, preferably 2 m/s.

As called for, the agitator 7 may be operated continuously or discontinuously to assure better mixing between the emulsion and the individual air bubbles.

The equipment of the innovation contributes significantly to relieving environmental pollution by the unit, and in particular the strong odors into the environment generated by conventional equipment are fully avoided, while on the other hand the energy consumption for heating the emulsion and also for condensing the heat exchanger is substantially reduced with simultaneous substantial increase in efficiency.

I claim:

1. Phase-separation equipment for thermally separating an emulsion, in particular a water-oil emulsion, comprising:
   a container for receiving an emulsion, said container including a top section and a bottom section;
   a heater for heating an emulsion placed in the bottom section of the container;
   a discharge outlet formed in the top section of the container for evacuating vaporous constituents of the emulsion;
   a condenser in communication with the discharge outlet for condensing the vaporous constituents; and
   means for introducing distributed air into the emulsion in the container said means for introducing distributed air including a two-dimensionally arranged pipe array, having a plurality of spaced discharge apertures, located in the bottom section of the container.

2. Equipment as defined in claim 1, including an air feedback means for connecting the discharge outlet with the means for introducing distributed air into the container.

3. Equipment as defined in claim 2 including a hookup means in the feedback means for the separate supply of compressed air or the discharge of feedback air to and from the feedback means.

4. Equipment as defined in claim 1, including a high-pressure air blower in communication with said air feedback means and arranged to blow air from the discharge outlet to said means for introducing distributed air into the container.

5. Equipment as defined in claim 1, wherein the pipe array comprises individual and mutually parallel pipes communicating at one of their ends with a cross-connection to said air feedback means, and with their other ends disposed outside the container and being each fitted with a detachable closure means.

6. Equipment as defined in claim 1 including an agitator in the container for agitating an emulsion in the container.

7. Equipment as defined in claim 1 including a heater in the container, and means for controlling the heater relative to the temperature of an emulsion in the container.

8. Equipment as defined in claim 1 wherein the diameter of the discharge apertures is in the range of 6 to 12 mm.

9. Equipment as defined in claim 1 wherein said pipe array is made of stainless steel.

10. In a method for thermally separating an emulsion, in particular a water-oil emulsion, wherein the emulsion is heated in a container and a cloud of vapor including a vaporized constituent of the emulsion is generated at the surface of the emulsion and evacuated from the top side of the container, the improvement comprising:

providing means for introducing distributed air including a two-dimensionally arrangement pipe array, having a plurality of spaced discharge apertures, located in a bottom section of the container; and introducing air through said providing means in a finely distributed and two-dimensional manner to form finely distributed air bubbles inside the emulsion.

11. The method as defined in claim 10, including condensing a condensible phase of the evacuated vapor constituent outside the container and introducing, i.e., feeding back at least part of the remaining gaseous constituents or the residual air near the bottom of the container in finely and two-dimensional manner while forming finely distributed air or gas bubbles inside the emulsion, and wherein the feedback of the air or of the gaseous constituents occurs in a closed system including the container and the condenser.

12. The method as defined in claim 11 including introducing the air or the gaseous constituents into the container at high pressure, preferably by means of a high-pressure blower.

13. The method as defined in claim 10, including the step of feeding back air constituting part of the evacuated cloud into the air stream introduced at the bottom region of the container in a closed loop system.

14. The method as defined in claim 13, including using a blower to circulate the air in said closed loop system.

* * * * *